US008607275B2

(12) United States Patent
Haber et al.

(10) Patent No.: US 8,607,275 B2
(45) Date of Patent: *Dec. 10, 2013

(54) DIRECTING INTERNET SHOPPING TRAFFIC AND TRACKING REVENUES GENERATED AS A RESULT THEREOF

(75) Inventors: Jeff Haber, Dallas, TX (US); Kristin Haber, Dallas, TX (US)

(73) Assignee: kenxus, LLC, Austin, TX (US)

( * ) Notice: Subject to any disclaimer, the term of this patent is extended or adjusted under 35 U.S.C. 154(b) by 309 days.

This patent is subject to a terminal disclaimer.

(21) Appl. No.: 12/658,445

(22) Filed: Feb. 5, 2010

(65) Prior Publication Data

US 2010/0145795 A1   Jun. 10, 2010

Related U.S. Application Data

(63) Continuation of application No. 11/196,592, filed on Aug. 3, 2005, now Pat. No. 7,664,678, which is a continuation of application No. 09/628,569, filed on Jul. 31, 2000, now Pat. No. 7,000,242.

(51) Int. Cl.
  *G06Q 30/02*   (2012.01)

(52) U.S. Cl.
  USPC ........... 725/50; 705/26.1; 705/14.4; 725/133; 725/61

(58) Field of Classification Search
  USPC .............................................. 705/26; 725/37
  See application file for complete search history.

(56) References Cited

U.S. PATENT DOCUMENTS

| | | | | |
|---|---|---|---|---|
| 5,929,850 | A * | 7/1999 | Broadwin et al. | 725/110 |
| 6,147,686 | A * | 11/2000 | Brown et al. | 715/839 |
| 6,188,398 | B1 * | 2/2001 | Collins-Rector et al. | 725/37 |
| 6,229,541 | B1 * | 5/2001 | Kamen et al. | 715/719 |
| 6,314,575 | B1 * | 11/2001 | Billock et al. | 725/87 |
| 6,356,908 | B1 * | 3/2002 | Brown et al. | 707/10 |
| 6,385,592 | B1 * | 5/2002 | Angles et al. | 705/14 |
| 6,421,067 | B1 * | 7/2002 | Kamen et al. | 715/719 |
| 6,557,054 | B2 * | 4/2003 | Reisman | 710/33 |
| 6,629,135 | B1 * | 9/2003 | Ross et al. | 709/218 |
| 6,690,391 | B1 * | 2/2004 | Proehl et al. | 715/720 |

OTHER PUBLICATIONS

PR Newswire, "Medialink and iSurfTV Introduce Internet-Based Video With Interactive Embedded Hyperlinks," New York, Sep. 28, 1999, p. 1 (three pages total).*

* cited by examiner

*Primary Examiner* — Scott Zare
*Assistant Examiner* — Talia Crawley

(57) ABSTRACT

A system having a client, a host server, a sponsor server, and a video server, which are all interconnected via the Internet and which operate seamlessly together in order to provide video content to an end user at the client and allow the end user at the client to purchase products and/or services from the sponsor that are featured in the video content provided by the video server. As the user views video content on his or her computer, images associated with segments of the content are periodically provided in conjunction with the video content. Each image contains an image map, which defines areas in the image. Each defined area is associated with a product which is displayed in that area of the image. Each defined area is also associated with an anchored hyperlink which links to web content from a sponsor server. The web content includes product information for that particular product featured in that area of the image. Accordingly, by selecting an item in the image, product information is retrieved from a sponsor server and provided to the user so he or she may purchase the product seen in the video content Additionally, various user activities and interactions, including which videos are selected for viewing and which products are purchased, are tracked for several purposes. This tracking can be used to determine which videos and products are viewed and purchased more often, as well as for generating revenue sharing reports for purposes of profit sharing.

20 Claims, 6 Drawing Sheets

| USER ID | ACTION | PAGE | DATE | TIME |
|---|---|---|---|---|
| Jcarr | Logged On | Host Webpage | May 9, 2000 | 4:09:44 |
| Jcarr | Opened New User Interface | Britney Spears Video | May 9, 2000 | 4:09:46 |
| Jcarr | Clicked on Image | GAP: Red Pants | May 9, 2000 | 4:10:52 |
| Jcarr | Selected Option to Buy | GAP: Red Pants | May 9, 2000 | 4:12:52 |
| Jcarr | Logged Off | Host Webpage | May 9, 2000 | 4:15:34 |

FIG. 5

DIRECTING INTERNET SHOPPING TRAFFIC AND TRACKING REVENUES GENERATED AS A RESULT THEREOF

CROSS REFERENCE TO RELATED APPLICATIONS

This is a continuation of application Ser. No. 11/196,592 filed Aug. 3, 2005 now U.S. Pat. No. 7,664,678 which was a continuation of application Ser. No. 09/628,569, filed Jul. 31, 2000, now U.S. Pat. No. 7,000,242.

FIELD OF THE INVENTION

The invention relates generally to the field of Internet websites and e-commerce; and, more particularly, to directing Internet traffic to various e-commerce sites using interactive video and tracking revenues generated as a result of such direction.

BACKGROUND

The Internet has allowed people from all over the world to access information on various products and services made available to these users, at literally the touch of a button. E-commerce sites on the Internet for on-line shopping provide many products and services to users of the Internet through a variety of shopping venues or interfaces. These e-commerce sites typically provide specific information regarding products and services and allow users to purchase these products and services directly over the Internet. More specifically, a typical e-commerce website will provide multiple webpages that allow the user to access information about various products and services by moving from one page to the other. The user may typically search through the website by entering a product query and conducting an automated search of the multiple pages in the website, or the user may select a product classification—such as "electronics"—and delve through the multiple pages, layer after layer, sifting through various levels of information until he locates the products or services he is interested in purchasing. In some cases, the user will reach a page on the website which contains information on the product or service in which he is interested. The user will then select that particular product or service and more detailed information will be provided. This information may often be accompanied by an image of the product or service and an option or instructions for purchasing.

The user may then purchase these products and services directly through a virtual shopping cart. When a user wishes to purchase a product or service, he or she simply clicks an appropriately labeled icon, and the item is then placed in the virtual shopping cart. Normally, the quantity and price will also appear at the virtual shopping cart. The user may review the contents of the virtual shopping cart at any time and remove items from the cart. Typically, the user will continue with his or her on-line shopping at the website until he has selected all the products or services wanted from that website. The user will then typically check-out from the website. The checkout process normally involves confirming the products in the virtual shopping cart for purchase, entering credit card/billing information, and entering a shipping address. In many cases, however, the user abandons the virtual shopping cart and leaves the web site without ever completing the check-out process, resulting in a lost sale to the e-commerce vendor.

In these types of e-commerce websites, there are several limitations. First, the user can only access the products and services available at that website. Accordingly, a user may have to jump from one website to the other in order to purchase different products and/or services. Additionally, the user will have to perform a search of the website each time in order to locate the products and services in which he or she is interested. For example, a website may sell home furnishings and clothing, with the website designed such that information about the home furnishings is placed on one web page and information about the clothing is on another web page. If the user wants information about both, he or she must move from page to page within the website. Finally, these sites are not conducive to the "impulse buyer". Instead, they are geared more toward providing a consumer with products or services in which he is already interested in purchasing, versus capitalizing in on the spot advertising and product placement in videos and commercials in order to sell additional goods to the consumer. Accordingly, Internet traffic at these e-commerce sites is often highly dependent upon a user knowing which products or services he or she is interested in purchasing. This is significant since many e-commerce sites fail because they do not have enough business and are unable to direct heavy streams of continued traffic and business to their websites.

The Internet also provides users with a host of entertainment websites. These websites may provide audio and/or video content for a user to listen to and/or watch via his or her computer. The user is typically given a number of videos from which to select, ranging from music videos to full length motion pictures, and the user may view these videos directly on his or her computer. Often, the user may see some product in the video that he desires to own, such as a pair of shoes, a shirt, or an automobile. It is desired to capitalize on this impulse buy phenomenon at the very moment it arises. Unfortunately, the user often does not know the brand name, make or model of the product or where to purchase the product. Further, the user may lose interest as time elapses and is not likely to follow-up on finding out more about the product or purchasing the product. Accordingly, a potential sale of the product to that user is being missed.

Therefore, what is needed is a method for effectively and efficiently combining entertainment websites with available products and services in order to directly link web traffic from a website having video content to various product and service websites, thereby promoting and encouraging efficient e-commerce and capitalizing on potential impulse buyers. What is further needed is a way to direct web traffic to various e-commerce websites in a user-friendly manner, which is fully interactive and highly visible. What is further needed is a business method and model for tracking user activity at these e-commerce websites in order to share profits from purchases made as a result of directing the web traffic to the website.

SUMMARY OF THE INVENTION

In one aspect, the invention allows a user to view video content displayed on the user's computer, while shopping for items featured within the video content all within a single user interface without having to jump from web page to web page.

In a further aspect, the present invention includes a system having a client, a host server, a sponsor server, and a video server, which are all interconnected via the Internet and which operate seamlessly together in order to provide video content to an end user at the client and allow the end user at the client to purchase products and/or services from the sponsor that are featured in the video content provided by the video server.

In yet another aspect of the invention, as the user views video content on his or her computer, images associated with segments of the content are periodically provided in conjunction with the video content. Each image contains an image map, which defines areas in the image. Each defined area is associated with a product which is displayed in that area of the image. Each defined area is also associated with an anchored hyperlink which links to a web content from a sponsor server. The web content includes product information for that particular product featured in that area of the image. Accordingly, by selecting an item in the image, product information is retrieved from a sponsor server and provided to the user so he or she may purchase the product seen in the video content.

In another aspect of the invention, the video content, image and sponsor product information are all preferably provided within a single user interface, such as a single webpage. Accordingly, a user does not have to jump from one webpage or website to another in order to purchase the products or services she sees in the video content.

In still another aspect of the present invention, various user activities and interactions, including which videos are selected for viewing and which products are purchased, is tracked for several purposes. This tracking can be used to determine which videos and products are viewed and purchased more often, as well as for generating revenue sharing reports for purposes of profit sharing between the host and the sponsor.

BRIEF DESCRIPTION OF THE DRAWINGS

FIG. 5 illustrates one embodiment of a tracking report.

DETAILED DESCRIPTION

The present invention allows a host server to provide video content to an end user, the video content featuring products and services available for purchase. As the user views the video content, he can select products he wants to purchase. Software resident on the host server seamlessly retrieves information about the products and services displayed in the video content from various sponsor servers and provides this information to the user. A user can then purchase the products and services he just saw in the video content. In a preferred embodiment, the entire process is fully integrated within a single user interface, such as a single webpage, so there is no need to jump from one webpage to another to view video content, select products of interest, view product information or purchase such products. The invention further allows a host to track user activity and purchases, in order to generate revenue sharing reports based upon that activity.

System Overview

Figure 1:
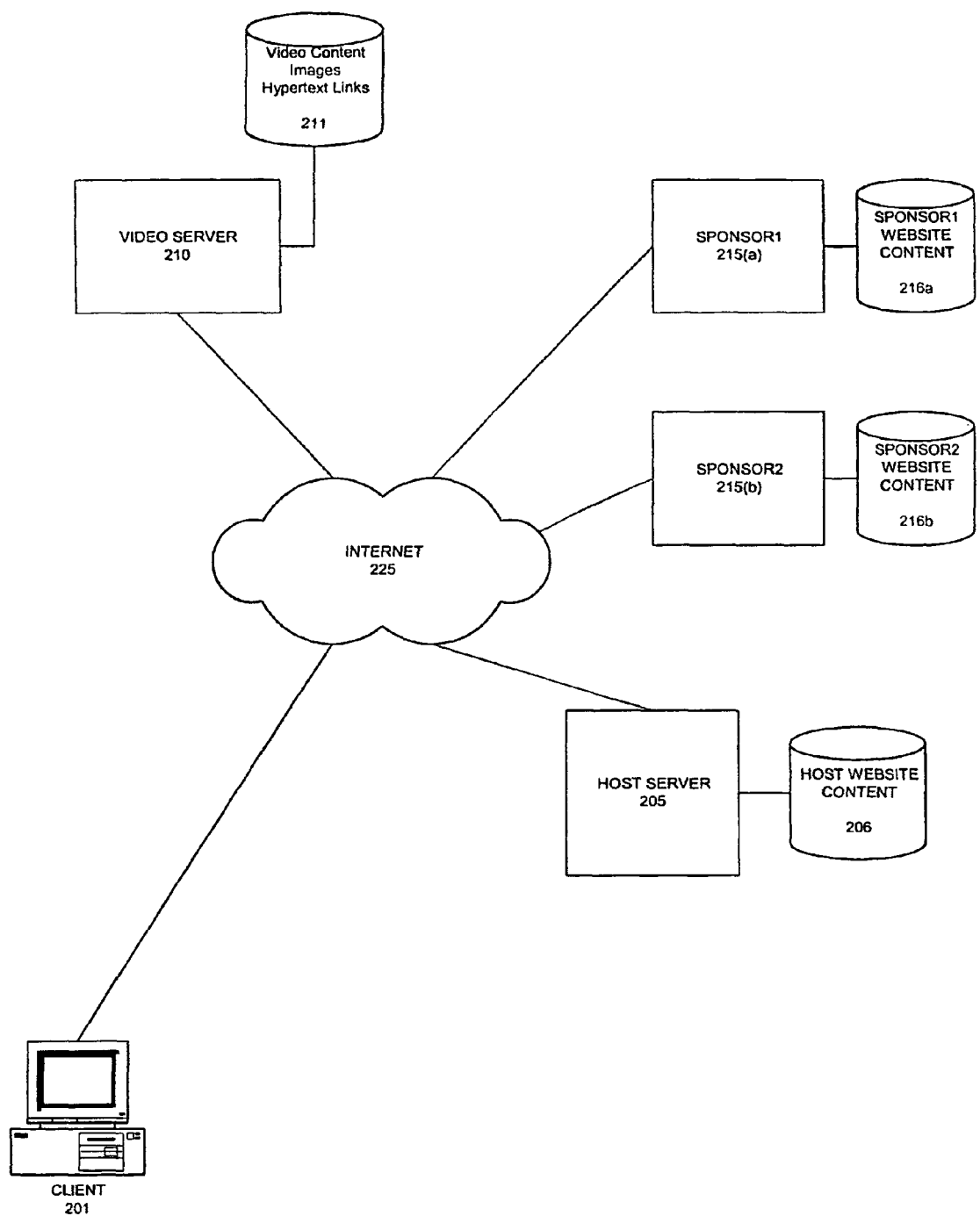
FIG. 1 illustrates a system in accordance with one embodiment of the present invention.

Referring now to FIG. 1, there is shown an illustration of a system in accordance with one embodiment of the present invention. It will be appreciated that the system illustrated in FIG. 1 may be incorporated in to larger, more complex systems while still providing the features and benefits of the invention. As shown, the system includes a client 201, a host server 205, a video server 210 and multiple sponsor servers 215a and 215b. These are all coupled together via a network 225. The network 225 is preferably the Internet; but can also be an intranet, a dual or token ring network, or any other wide area network (WAN).

The client 201 is the computer through which an end user accesses the network. The client is configured to access the Internet using a conventional web browser, such as Netscape or Windows Internet Explorer. In a preferred embodiment, the browser is capable of supporting frames. In addition, the browser includes a video player plug-in, such as Real Player from Real Networks or Quicktime 4.0 from Apple Computer, Inc.

In a preferred embodiment, the host server 205 contains a Webserver (e.g. Apache Webserver or Enterprise Server) for serving web content, including providing a user interface via a webpage that combines video content with on-line shopping capability. The host server 205 retrieves video content from the video server 210 and provides the video content to the client for a user to view. The video content contains any number of products available for purchase. The host server 205 also retrieves website content resident on one of the sponsor servers 215a or 215b, respectively, by deep linking to a webpage where the content is resident, whenever a user selects one of the products featured in the video content. The web content includes specific product information about the selected product. This product information is retrieved from a particular webpage within the sponsor server 215a or 215b, and is then integrated into the single webpage which is provided to the client by the host server 205. Accordingly, using a single webpage, an end user can observe video content and shop for items or services featured in the video content without having to jump from one webpage to another. The host server 205 further includes software for tracking user activity in order to determine which products and services are purchased.

The video server 210 accesses a content database 211 which contains video content, images (such as .gif or .jpg images) which correspond with the video content. The content database 211 also includes hypertext links which correspond with each of the images. These are also retrieved by the video server 210 as the video content is played. The video content can include music videos, commercials, movie trailers, full-length feature films or any other type of video content, stored in a conventional format such as the MPEG standard format. Each video content is associated with a number of images. Each of these images corresponds with a single segment of associated video content. More preferably, each such image is selected from a single frame in the corresponding segment of video content. Alternatively, the image may correspond with any frame within the segment of video content or it may be a representative still image which is a single composite of the entire segment of video content.

In a preferred embodiment, the images include an image map which is segmented into a number of areas such that a different item or product is featured or positioned in each area of the image map. Each area of the image map is then anchored with an associated hyperlink. Accordingly, a single image will have a number of products featured in the image, each product positioned in an area of the image map and anchored to a hyperlink. The hyperlink is a deep link to a webpage in the corresponding sponsor website where the specific information about that product can be found. The different items featured in the images correspond with products and services featured in the corresponding segment of video content. Accordingly, when an item featured in one of the areas of the image map is selected by the user, the hyperlink which corresponds with that area of the image map is activated. Using the hyperlink, information about the product is automatically retrieved from a sponsor website, and displayed for the user to view and purchase the product.

The sponsor servers 215*a* and 215*b* are the e-commerce servers which provide the information about the various products and services featured in the video content. For example, a first sponsor server 215*a* may be associated with a clothing manufacturer, and may provide information about clothing featured in the video content and the corresponding images by retrieving the information from a storage device 216 resident on or coupled to the first sponsor server. A second sponsor sewer 215*b* may be associated with a jewelry manufacturer, and may provide information from storage device 217 about jewelry or other accessories featured in the video content and the corresponding images. The sponsor servers 215*a* and 215*b* will provide this information to the host server 205 whenever one of its corresponding products is selected from the images or hypertext links. IN a preferred embodiment, the host sewer 205 will deep link to a webpage on the sponsor sewer 215*a* or 215*b* and retrieve the webpage from the sponsor sewer 215*a* or 215*b*. The webpage will contain information specific to the product selected. The webpage will be appropriate sized and displayed in the user interface or webpage. Alternatively, the deep link may link to an address where web content information specific to the product selected is stored. In this case the information (such an image, pricing, color, availability, stock number, etc.) is passed on the host server 205 and the host server constructs and organizes the information for display within the user interface or webpage. In this case, the host server will integrate the product information from the sponsor website directly into the webpage so a user can view and purchase different products without having to jump from one webpage to another while continuing to view the video content.

User Interface or Webpage

As explained earlier, the host server 205 contains software for providing a user interface, such as a webpage, which combines video content with interactive on-line shopping capability. In a preferred embodiment, a user accesses video content through a host website which is provided by the host server 205. The host website will provide at least one webpage having a number of icons or thumbnail images which correspond with different video content available for viewing. For example, a host website may provide several thumbnails which correspond with a number of different music videos which are available for viewing. Alternatively, the thumbnails may correspond with commercials, short videos, movie trailers, or full length motion pictures available for viewing. The user selects the desired video content he wishes to view by selecting one of the thumbnails, and a new webpage is generated by the host server 205.

Figure 2:
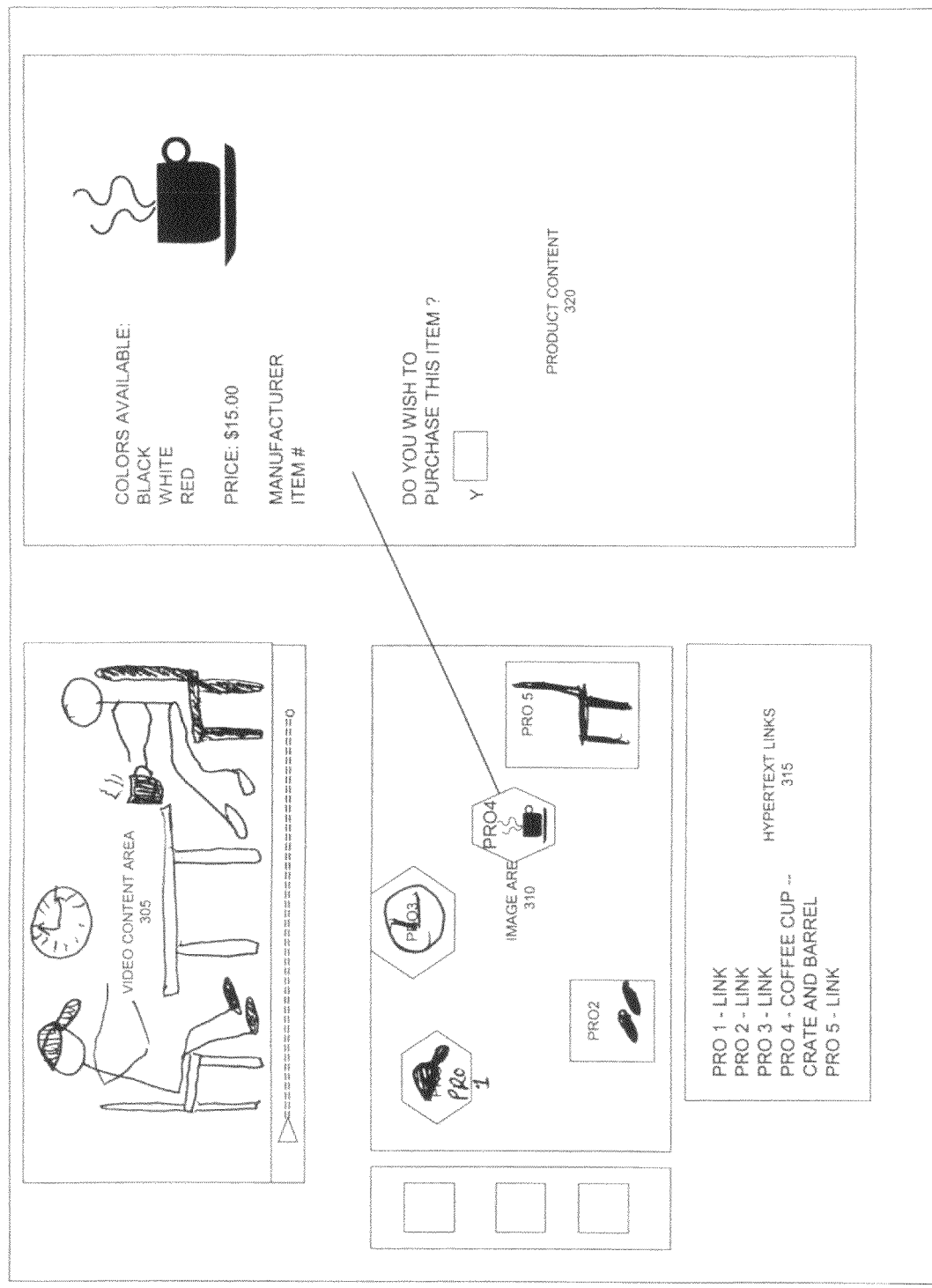
FIG. 2 illustrates a preferred embodiment of a user interface which is a webpage generated by a host server.

FIG. 2 illustrates a preferred embodiment of the new webpage generated by the host server 205. As shown, the webpage preferably includes several main areas. A first area is the video content area 305. This area of the user interface displays the video content which the user has selected for viewing. The video content is provided by the video server 210, As explained earlier, the user will view the webpage using a web browser which includes a video player plug-in, such as the Real Player™ by Real Networks or the Quicktime™ Video Player by Apple Computers. It is understood that alternative video player plug-ins may be utilized and the invention is not limited to use with any one particular video player plug-in. As with most video content players, the video content area will also provide controls for stopping, starting, pausing, fast-forwarding, or reversing the video content, as desired by the end user.

A second area of the user interface is the image area 310. This area of the user interface displays the image which corresponds with the segment of the video content currently being displayed in the video content area 305. As a video is played in the video content area, the video server 210 provides the image corresponding to the current segment of video content being played. Thus, the image is periodically updated to correspond with the current segment of video content being displayed in the video content area 305. Preferably, the image is a still from the current segment of video content being played. Alternatively, the image may be a composite representative image of the current segment of video content being played.

FIG. 2 illustrates an example of an image having five different products PRO1-PRO5 available for purchase. Each of these products is featured in the corresponding segment of video content. These products are located at different areas within the image. The image is embedded with an image map which defines the shape and size of each of the areas in which the products are located in the image. In one embodiment, these areas are either rectangular or hexagonal in shape. Each region is anchored to an associated hyperlink which links to a corresponding sponsor website where information about the item featured in that area is available. When a user selects an item from the image, the link associated with the area in which the item is located is activated and the information about the item is retrieved from the appropriate sponsor server 215*a* or 215*b*.

Figure 3:
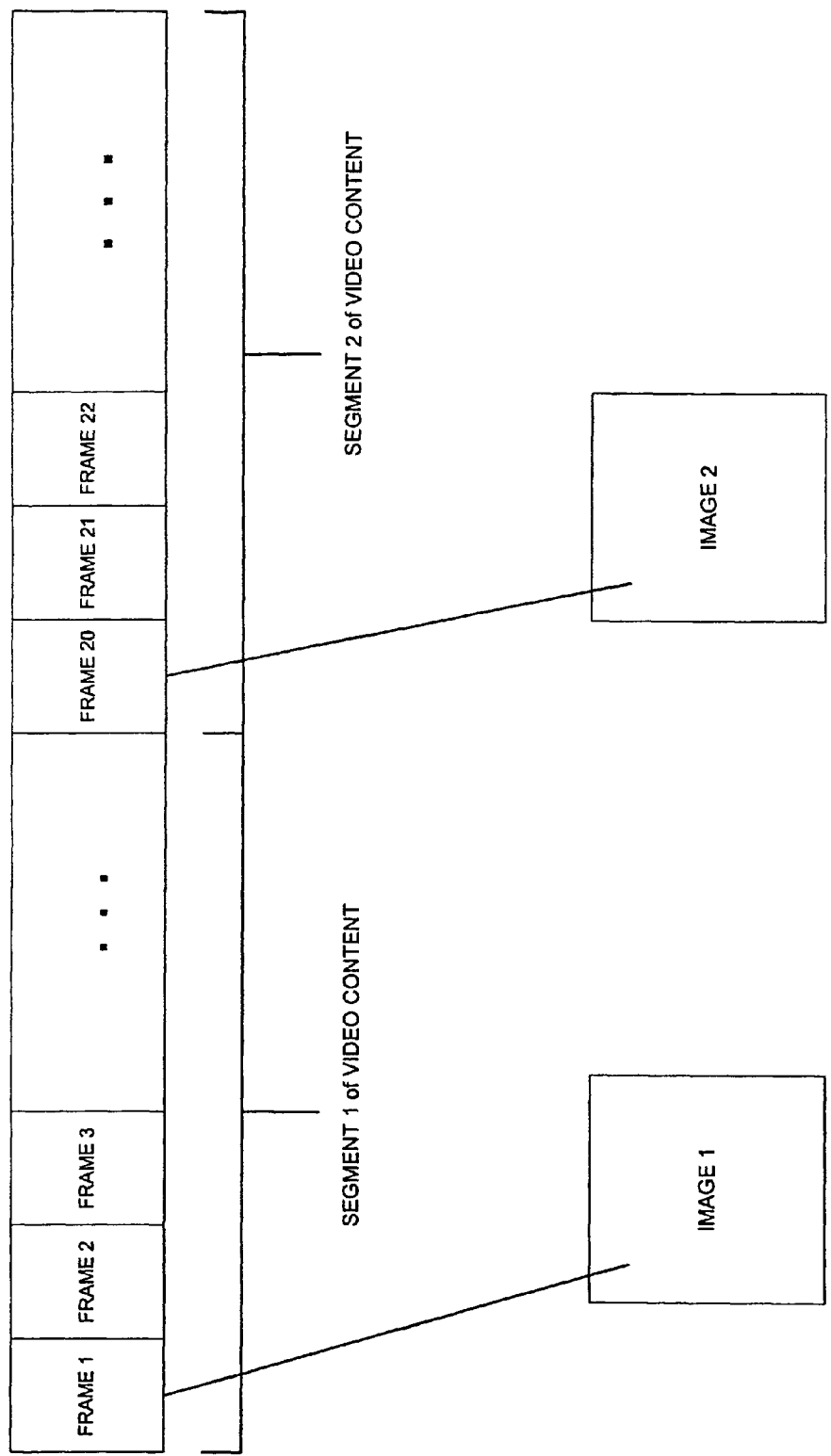
FIG. 3 illustrates the concept of providing segmented video content and images which correspond with each segment of video content.

In a preferred embodiment, the image is updated by the video server 210 at regular intervals as the video content is displayed such that as each segment of the video content is played, the corresponding image for that segment will also be displayed. FIG. 3 illustrates this concept in greater detail. As shown in FIG. 3, the video content is divided into a number of segments (shown as segments 1 an 2 in FIG. 3). Each segment has a corresponding image. As the video content is displayed in the video content area 305, the images displayed in the image area 310 are updated. Accordingly, in the embodiment illustrated in FIG. 3, when the video begins playing, the first image IMAGE1 is displayed in the image area 310. In the embodiment illustrated in FIG. 3, the image corresponds with the image in frame 1 of the video content. As the video content continues to play, it reaches a second segment of video content which begins at frame 20. At this time, the image displayed in the image area 310 is updated to a new image. The new image displayed IMAGE 2 corresponds with the image in frame 20 of the second segment of video content. In the embodiment illustrated in FIG. 3, the image displayed in the image area corresponds with the first frame in each segment of video content. It is understood that this is only one preferred embodiment and, alternatively, the image displayed may correspond with any one of the frames in the corresponding segment of video content or it may be a representative composite of all the frames in a given segment of video content.

Optionally, a smaller image icon area 312 may be positioned adjacent to the image area 310. This image icon area 312 will show thumbnails for the previously displayed image, the currently displayed image, and the next image yet to be displayed. Using the thumbnails displayed in the image icon area 312, a user may jump back to the last image displayed in order to buy previously shown products; or, the user may jump forward to the next image in order to see different products available. As each segment of video content is played in the video content area 305, the thumbnails displayed in the image icon area 312 are also updated such that the image content area always shows thumbnails for the previously displayed image, the currently displayed image, and the next image to be displayed (which corresponds with the next segment of video content).

Referring again to FIG. 2, a third and optional area in the user interface is a hypertext link area 315. This area is used to display a set of hypertext links which correspond with each image and each segment of video content currently being displayed in the other areas of the webpage. In a preferred embodiment, the hypertext links are textual links which match those links associated with the areas of the image. As explained before, the image displayed in the image area has a number of defined areas or regions, each area or region is associated with a hyperlink. The hypertext links in the hypertext link area 315 are textual links which link to the same sponsor websites as the hyperlinks which are tied to the areas or regions of the image. Accordingly, each hypertext link is a deep link into a corresponding sponsor website to a page where specific product information for the corresponding product is contained and from which the user may purchase the product. As the image displayed in the image area changes, the set of hypertext links displayed in the hypertext link area also changes to correspond with the products featured in the image. Therefore, the hypertext link area 315 contains a textual representation of the information displayed in the image area 310. Referring to FIG. 2, if it is assumed that the product labeled PRO4 in the image is a coffee mug, then a corresponding hypertext link may appear as shown in FIG. 2. In a preferred embodiment, the hypertext link will include the name of the item and the name of the sponsor. For example, in FIG. 2, the corresponding hypertext link reads "COFFEE MUG by CRATE & BARREL™ and would link to the CRATE & BARREL™ website.

A fourth area in the user display interface area is a product content area 320. This area is where the specific product information and purchase options which are retrieved from the sponsor servers 215*a* and 215*b* is displayed when a specific product or service is selected from the image or the hypertext links. Accordingly, when a user clicks on one of the items of merchandise featured in the image currently being displayed in the image area 310, or on one of the hypertext links displayed in the hypertext link area 315, the corresponding product information is retrieved from the sponsor server 215*a* or 215*b* and displayed in the product content area 320. For example, in FIG. 2, if the coffee mug in the image is selected, or if the appropriate hypertext link in the hypertext link area 315 is selected, then information about that product will be retrieved from one the appropriate sponsor server 215*a* or 215*b* and displayed in the product content area 320. Accordingly, in the example shown in FIG. 2, if the coffee cup is selected in the image or if the link which reads "COFFEE CUP by CRATE AND BARREL™" is selected, then product information about the coffee cup will be retrieved from the CRATE AND BARREL™ website and displayed in the product content area 320.

In one embodiment, the information displayed in the product content area 320 may contain a large photo or icon of the product. Accordingly, FIG. 2 shows an icon of a coffee mug in the product content area 320. Other information, such as size, available colors, price, manufacturer item #, and the item name may also be displayed. In a preferred embodiment, the product content area will also provide the user with an option to purchase the product directly from the sponsor. In a preferred embodiment, if no item has been selected the product content area 320 may be used to display any information specific to and/or designated by the host until and unless a product featured in the video content and corresponding image is selected.

Accordingly, there is no need to jump from one website to another in order to purchase the same coffee mug which appears in the video content. This helps capitalize on the "impulse" buy. Once the user sees the product in the video, he or she may purchase it directly from the vendor within a matter of seconds without ever having to leave the video.

Flow and Operations

Figure 4:
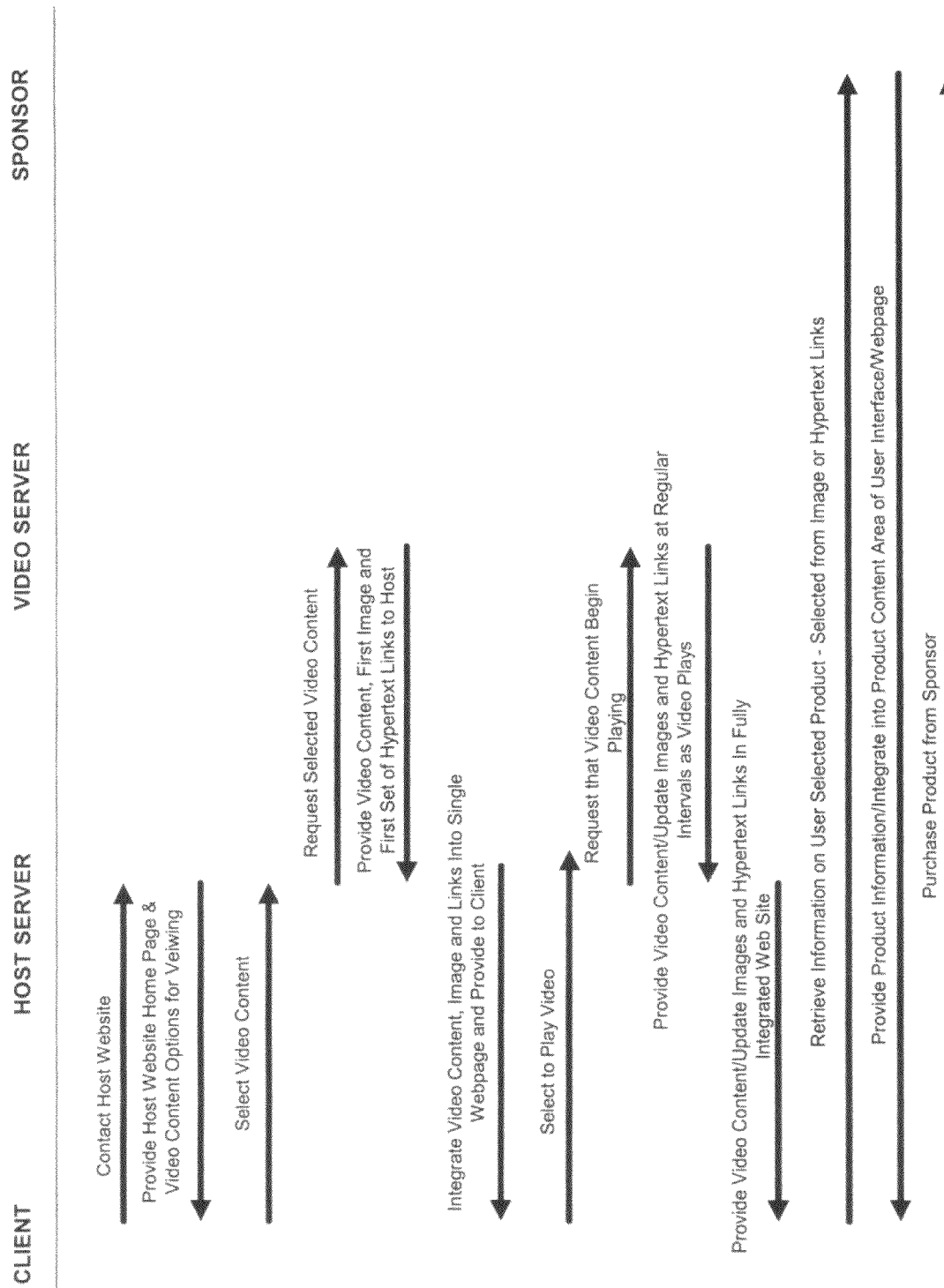
FIG. 4 illustrates a interaction diagram which shows the flow of information in one embodiment of the present invention.
Figure 6:
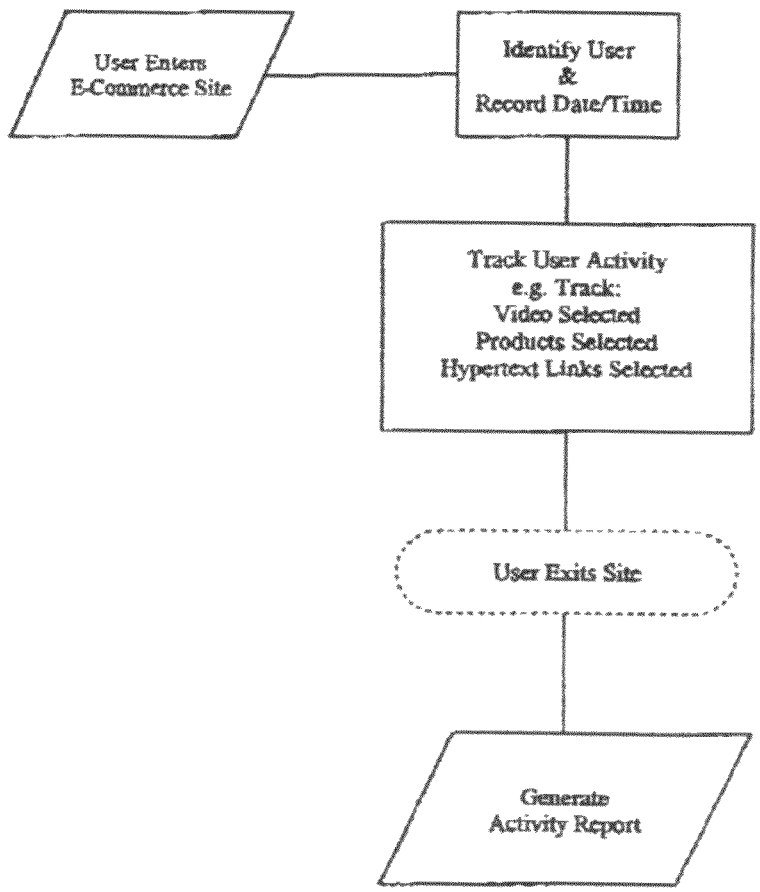
FIG. 6 illustrates user flow from point of entry to user exit, generating an activity report.

FIG. 4 illustrates an interaction diagram which shows the flow of information in one preferred embodiment of the present invention. As illustrated, a user selects a host website from which video content will be viewed using a web browser. The user enters the host website address information into his or her browser and the client server contacts the host website. The host server then provides the host website content to the user. The host website may contain multiple pages of information, each page preferably including a number of thumbnails corresponding to viewable video content selections, such as music videos, commercials, movie trailers, full length feature films, or any other video content. The user may view the full video content which corresponds with the thumbnails at any time by selecting one of the thumbnails. The user selects the appropriate thumbnail which corresponds with the video content he wishes to watch and that selection is forwarded on to the host server. The host server then sends a signal (e.g. a URL address and query string identifying the video) to the video server requesting that the video server download the requested video content which corresponds with the selected thumbnail.

The host server 205 uses software resident on the host to create the user interface or webpage as described earlier. In a preferred embodiment, the video server will provide the video content, the images, and the hypertext links all to the user through the user interface or webpage. The signal provided from the host server 205 to the video server 210 will include codes for directing the size and location where the video is to be displayed, such that the video will play in the video content area 305 of the user interface or webpage provided by the host server 210. Accordingly, the host server will integrate the video content, the images, the sets of hypertext links and any other content into a single webpage, such as shown in FIG. 2, and provide the webpage to the client.

In one embodiment, the video does not immediately play when the new user interface or webpage first opens. Instead, the user initiates the playing of the video. Accordingly, the user selects to play the video using the video controls which are also displayed in the video content area. In the case of streaming video content when a user selects to play the video content, the client sends a signal to the video server to begin playing the streaming video content. In the case of cached video content, video is downloaded and cached at the video server 210 and the host server begins retrieving the video content from the cache. The host server 205 can then appropriately resize the video such that it is properly displayed in the video content area 305 of the user interface or webpage.

Once the user begins viewing the video content, the video server begins to provide the images which correspond with the video content, continuously updating the images throughout the duration of the video content at each corresponding segment. Preferably, each image corresponds with a frame contained within a segment of the video content. This may be the first frame of the segment or any other frame in the currently displayed segment of video content being played in the video content area 305. As the video content is played, the images will preferably be updated at regular intervals.

Accordingly, as the video content is displayed, the image which is displayed in the image area of the new window user interface is continually updated, a new image being displayed as each segment of video content is played.

Optionally, the video server will also provide the thumbnails which are displayed in the smaller image icon area 312 positioned adjacent to the image area 310. This image icon area 312 will show thumbnails for the previously displayed image, the currently displayed image, and the next image yet to be displayed. Using the thumbnails displayed in the image icon area 312, a user may jump back to the last image displayed in order to buy previously shown products; or, the user may jump forward to the next image in order to see different products available. As each segment of video content is played in the video content area 305, the thumbnails displayed in the image icon area 312 are updated by the video server such that the image content area always shows thumbnails for the previously displayed image, the currently displayed image, and the next image to be displayed (which corresponds with the next segment of video content.

Along with the video content and the still images, the video server will also provide sets or groupings of hypertext links at regular intervals. As explained earlier, these sets or groupings of hypertext links will correspond with the products or services featured in the image currently being displayed. The hypertext links are integrated with the new window user interface and are displayed in the hypertext link area of the user interface. In a preferred embodiment, the sets of hypertext links displayed in the hypertext link area correspond with those which are embedded in the images, and a user may use either the image or the set of hypertext links to obtain additional information and/or purchase a sponsor's product.

For example, the still image may show a man wearing a sweater and sunglasses walking with a woman who is wearing a skirt, blouse and black shoes. A user may position a cursor over any of these items and click on the item, thereby being linked to the product manufacturer's website, which will contain more detail about the product we well as information on purchasing the product including price, quantity and stock.

Tracking

As indicated above, the host server also tracks the end user's activity from the time he or she enters the host website. In a preferred embodiment, the host server can track the date and time a user first enters the host website because the host website is preferably user id or password encoded. If a user id or password is used, as a user enters the host website, he or she will be prompted to enter his or her user id or password. The host server will validate the user ID or the password and record the time and date the user logs into the host website. From that point one, activity specific to that user can be tracked and recorded.

Alternatively, this can be done by placing a cookie on a users computer the first time he or she accesses the host server. This cookie will then be recognized when the user subsequently accesses the site from the same client 201. If a cookie is used, this information will be embedded in the cookie and a user will automatically be recognized each subsequent time he or she accesses the host server from the same client. From that point one, activity specific to that user can be tracked and recorded.

In a preferred embodiment, the software can track activities such as video content selected for display/viewing, products selected from the image, hypertext links selected (if any) and the date, time and day of the week these actions occur. In this embodiment, product information is simply passed from the sponsor servers to the host server and the host server reconstructs the display within the product content area 320 of the user interface or webpage. The host then accepts and processes all orders for product purchases and forwards this information on to the sponsor.

Alternatively, software resident on both the host system and the sponsor servers can work in concert to monitor activities within the interface or webpage provided by the host server and within the deep link to the product information within the sponsor server. In this embodiment, when a user selects one of the products in the image mapped image displayed in the image area 310, the deep link to the webpage where the product information is stored in the sponsor server is then used to retrieve the actual webpage from the sponsor server. The host server 205 will also pass user identification information on to the sponsor server. The webpage which is retrieved from the sponsor server using the deep link is then appropriately sized and displayed in the product content area 320 of the user interface or webpage. Accordingly, in this embodiment, user activities which occur within the product content area 320 of the webpage are actually monitored and recorded by the appropriate sponsor server. This activity is then reported to the host server on a regular ongoing basis. As further described above, the host server can also use the tracking software to generate activity reports which describe user activity. In a preferred embodiment, these reports can be generated on a weekly, hi-weekly or monthly basis to monitor user activity at the host website to determine which video content is viewed more often, which products are selected more often, which products are actually purchased and how often, what times and days is traffic the heaviest, etc.

FIG. 5 illustrates a preferred embodiment of a tracking report which may be generated by the tracking software resident on the host server. It is understood that this is only one format and the information tracked can be arranged and displayed in a written report in various formats. As shown in FIG. 5, entries 1 through 5 in the report track the activities of the user-id jcarr. This user logged on to the host website at 4:09:44 p.m. on May $9^{th}$. The user proceeded to select a Britney Spears video. The user then clicked on a product displayed in one of the images for Red Pants by the GAP™. The user then purchased the pants from the GAP. Finally, the user logged off of the host website at 4:15:34 p.m. cm May $9^{th}$.

Accordingly, the present invention is understood to be limited only by the scope of the subsequent claims, and not inherently limited by the details of the preferred embodiments disclosed above.

What is claimed is:

1. A method for providing internet traffic for on-line shopping via computer or other web-connected mobile device or television:

providing a segment of video content having a number of products featured in the video content which a user may purchase via computer or other web-connected mobile device or television;

providing an image which corresponds with the segment of video content, the image containing a number of user selectable areas, each user selectable area showing one of the products contained in the corresponding segment of video content, each user selectable area being anchored to a hyperlink, each hyperlink linking to an e-commerce website where specific information about the product resides and from which the product may be purchased via computer or other web-connected mobile device or television;

receiving a user's selection of one of the areas in the image showing one of the products contained in the corresponding segment of video content via computer or other web-connected mobile device or television;

using the hyperlink associated with the user's selected area to retrieve the specific information about the product contained in the corresponding segment of video content via computer or other web-connected mobile device or television; and providing the specific information about the product to the user via computer or other web-connected mobile device or television.

2. The method of claim 1 further comprising:

allowing the user to exercise an option to purchase the product on-line.

3. The method of claim 1 further comprising:

providing a set of user selectable hypertext links which correspond with the provided image, each hypertext link in the series corresponding with a product contained in the image, each hypertext link linking to an e-commerce site where specific information about the product resides and from which the product may be purchased.

4. The method of claim 3 further comprising:

receiving a user's selection of one of the hypertext links in the series;

retrieving the specific information about the product from the e-commerce site using the hypertext link; and providing the specific information to the user so he or she may purchase the product on-line.

5. The method of claim 1 further comprising:

tracking the user's activity, including the user's product selection from the user selectable products provided in the image and the user's purchase activity after the information about the product is retrieved from the e-commerce site.

6. The method of claim 5 further comprising:

generating an activity report for each user who selects one of the user selectable products provided in the image and retrieves information from the e-commerce site, said report containing information about the tracking of the user's activity.

7. The method of claim 4 further comprising:

tracking the user's activity, including the user's selection of one of the hypertext links in the series and the user's purchase activity after the information about the product is retrieved from the e-commerce site.

8. The method of claim 7, further comprising:

generating an activity report for each user who selects one of the hypertext links in the series of hypertext links and retrieves information from the e-commerce site, said report containing information about the tracking of the user's activity.

9. The method of claim 1 further comprising:

providing a new segment of video content having a number of new products featured in the video content which a user may purchase;

providing a new image which corresponds with the new segment of video content, the new image containing a number of new user selectable products which correspond with the new products featured in the new segment of video content, each new user selectable product in the new image being embedded with a hypertext link, each hypertext link linking to an e-commerce site where specific information about the new product resides and from which the new product may be purchased;

receiving a user's new product selection from the new user selectable products in the image;

retrieving the specific information about the user's selected new product from the e-commerce site using the embedded hypertext link; and providing the specific information about the new product to the user and allowing the user to exercise an option to purchase the new product on-line.

10. The method of claim 9 further comprising:

providing a new series of user selectable hypertext links which correspond with the new image, each hypertext link in the new series corresponding with one of the new products contained in the new image, each hypertext link linking to an e-commerce site where specific information about the new product resides and from which the new product may be purchased.

11. The method of claim 10 further comprising:

receiving a user's selection of one of the new hypertext links in the series;

retrieving the specific information about the new product from the e-commerce site using the selected hypertext link; and providing the specific information to the user so he or she may purchase the product on-line.

12. The method of claim 9 further comprising:

tracking the user's activity, including the user's product selection from the user selectable products provided in the new image and the user's purchase activity after the information about the product is retrieved from the e-commerce site.

13. The method of claim 12 further comprising:

generating an activity report for each user who selects one of the user selectable products provided in the new image and retrieves information from the e-commerce site, said report containing information about the tracking of the user's activity.

14. The method of claim 11 further comprising: tracking the user's activity, including the user's selection of one of the hypertext links in the series and the user's purchase activity after the information about the product is retrieved from the e-commerce site.

15. The method of claim 14, further comprising:

generating an activity report for each user who selects one of the hypertext links in the series of hypertext links and retrieves information from the e-commerce site, said report containing information about the tracking of the user's activity.

16. A system for use with a web browser or native application (app) via computer or other web-connected mobile device or television, comprising:

a processor;

a user interface, the user interface including a video area for displaying several contiguous segments of video content featuring products which may be purchased; and an image area for providing a series of images, each image in the series corresponding with one of the contiguous segments of video content and containing a number of user selectable areas, each area showing one of the products featured in the corresponding segment, wherein each user selectable area in the image is anchored with a hyperlink which corresponds with a sponsor webpage such that when the area is selected, information about the product shown in that area, including an option to purchase the product, is linked from the sponsor webpage using the hyperlink, and the information is displayed to the user via computer or other web-connected mobile device or television.

17. The system of claim 16, further comprising:
a hypertext link area for providing a set of user selectable hypertext links, each hypertext link in the set corresponding with one of the number of user selectable products contained in the image such that when one the hypertext links is selected, information about the corresponding product, inclining an option to purchase the product, is linked from the sponsor web site and provided to the user.

18. The system of claim 16, further comprising:
a product content area for displaying the information about the product and the option to purchase the product which was linked from the sponsor webpage using the hyperlink.

19. A user interface for use with a web browser or native application (app) via a computer or other web connected mobile device, comprising:
a video area, implemented on a computer or other web connected mobile device, for displaying several contiguous segments of video content featuring products which may be purchased;
an image area, implemented on a computer or other web connected mobile device, for providing a series of images, each image in the series corresponding with one of the contiguous segments of video content, or independent of the video segments and containing a number of user selectable areas, each area showing one of the products featured in the corresponding segment, wherein each user selectable area in the image is anchored with a hyperlink which corresponds with a sponsor webpage such that when the area is selected, information about the product shown in that area, including an option to purchase the product, is linked from the sponsor webpage using the hyperlink, wherein the information is displayed to the user via a computer or other web-connected mobile device or television;
a product content area, implemented on a computer or other web connected mobile device, for displaying the information about the product and the option to purchase the product which was linked from the sponsor webpage using the hyperlink.

20. The user interface of claim 19, further comprising:
a hypertext link area for providing a set of user selectable hypertext links, each hypertext link in the set corresponding with one of the number of user selectable products contained in the image such that when one the hypertext links is selected, information about the corresponding product, including an option to purchase the product, is linked from the sponsor web site and provided to the user.

* * * * *